United States Patent [19]

Petino

[11] Patent Number: 5,296,083

[45] Date of Patent: Mar. 22, 1994

[54] PROCESS AND APPARATUS FOR REMOVAL OF ASBESTOS FLOOR TILE

[76] Inventor: Onofrio G. Petino, 1580 E. 13th St., Brooklyn, N.Y. 11230

[21] Appl. No.: 897,027

[22] Filed: Jun. 11, 1992

[51] Int. Cl.⁵ .............................................. B32B 35/00
[52] U.S. Cl. ..................................... 156/344; 156/80; 156/584; 62/62; 225/93.5; 134/17; 83/15; 83/170; 264/28
[58] Field of Search ......................... 156/344, 584, 80; 62/62, 64; 134/17; 264/28; 427/398.3, 398.4; 30/170; 83/15, 170; 275/93.5; 241/DIG. 37

[56] References Cited

U.S. PATENT DOCUMENTS

| | | | |
|---|---|---|---|
| 2,399,679 | 5/1946 | Jackson | 62/231 |
| 2,421,753 | 6/1947 | Joyce | 62/373 |
| 4,255,216 | 3/1981 | Conant et al. | 225/93.5 X |
| 4,963,224 | 10/1990 | Anderson | 156/584 |
| 4,981,548 | 1/1991 | Poll | 156/344 X |
| 4,983,809 | 1/1991 | Maiette et al. | 30/170 X |
| 5,002,629 | 3/1991 | Nakamura | 156/344 X |
| 5,091,042 | 2/1992 | Bruckner | 156/584 |
| 5,098,506 | 3/1992 | Brown et al. | 156/344 |
| 5,230,140 | 7/1993 | Nardella et al. | 241/DIG. 37 X |

FOREIGN PATENT DOCUMENTS 7024760  5/1987  Japan ........................... 241/DIG. 37

Primary Examiner—David A. Simmons
Assistant Examiner—Mark A. Osele
Attorney, Agent, or Firm—Lawrence Hager

[57] ABSTRACT

A method for removal of asbestos floor tile comprising the following steps: lowering the temperature of a selected tile section and the adhesive material between said tile(s) and the juxtaposed subflooring; maintaining the temperature reducing agent for a period of time sufficient to cause said adhesive material/layer to substantially lose its bonding properties; removing the debonded asbestos tile from the subflooring and disposing according to Governmental regulations.

A manually transportable housing dimensioned for receiving therewithin a quantity or block of dry ice. Said housing having a bottom section defining an opening for being aligned with a selected asbestos floor tile(s). Blower means mounted to said housing for directing an air stream over said dry ice and downwardly through said opening unto said tile(s).

1 Claim, 3 Drawing Sheets

PROCESS AND APPARATUS FOR REMOVAL OF ASBESTOS FLOOR TILE

FIELD OF THE INVENTION

The present invention is directed to a method and apparatus for removal of floor tile, and in particular the relatively safe removal of asbestos floor tile.

BACKGROUND OF THE INVENTION

It is often necessary to remove and replace asbestos floor tile with non-asbestos tile. Typically, the asbestos tile is manually removed by scraping and breaking sections of the tile with a knife and other blade devices, which can cause dangerous asbestos particles to become airborne. Simply forcing or breaking off the asbestos tile by mechanical means is laborious, relatively expensive, inefficient and hazardous to the workers and others within the general environment. In addition, the problem of containing/stacking, shipping and disposing of the hazardous scraps and pieces of waste material produced by the prior art methods is substantial. It is noted that such prior art methods produces numerous asbestos fiber surfaces about each broken-off piece of tile and, consequently, detectable airborne asbestos contamination of the air environment.

Since large quantities of scraps and pieces of tile are more difficult to containerize, transport, and store than uniform originally shaped tile sections, for example, flat square foot tiles, such prior art techniques and removal methods are relatively expensive and wasteful of our limited disposal sites for hazardous materials.

BRIEF DESCRIPTION OF FOUR RELATED PRIOR ART PATENTS

1. U.S. Pat. No. 3,934,379 issued Jan. 27, 1976, to Norman R. Braton and Jan R. Acker, describes a method for removal of layers of organic material built up on a support for articles during surface coating.

This patent does not teach the use of cryogens or any other temperature lowering method for the removal of hazardous asbestos floor tile, nor is this patent concerned with and does not recognize the problems of removal, handling, transporting and storing of hazardous asbestos materials.

2. U.S. Pat. No. 4,956,042 issued Sep. 11, 1990, to Jean-Luc Hubert, et al, describes a method of embrittling and removing an outer protective coating of a pipe or pipeline. The pipe is enclosed to define an annular space and a cryogen is expanded within this annular space to cause embrittlement of the coating to be removed.

Thus, it is an object of this patented invention to embrittle the coating material, i.e., the protective coating surrounding a pipe, to facilitate its removal. This patented invention does not appear to be concerned with nor does it teach a method to substantially reduce and/or eliminate the causes of airborne asbestos that may result from the breaking of embrittled floor tile sections.

In total contrast to the '042 patent discussed above, the present invention is directed not at the embrittlement of asbestos floor tile but rather the freeing or debonding of the floor tiles from the subflooring in substantially unbroken condition with its structural characteristics and asbestos fibers within the tile substantially unchanged from its condition prior to removal. In this manner, it is an object of the present invention to enable removal of intact floor tiles with their structural integrity substantially maintained, i.e., its properties to constrain the asbestos fibers unchanged.

3. U.S. Pat. No. 2,421,753 issued Jun. 10, 1947 to W. J. Joyce teaches a means for unblocking lenses. This patent does not show, describe, or suggest a method for removing floor tile while substantially reducing or eliminating the risk of causing the release of airborne asbestos fibers into the environment.

4. U.S. Pat. No. 2,399,679 issued May 7, 1946 to G. W. Jackson also shows a means for unblocking lenses. It is noted that this patent is not concerned with nor does it suggest or describe a method of handling hazardous waste materials such as asbestos.

SOME OF THE ADVANTAGES OF THE PRESENT INVENTION

In total contrast with the prior art patents noted above and the prior art related to the removal of floor tiles, the present invention provides a more efficient, cost effective and substantially safer method and means for the removal of floor tiles, and in particular, floor tiles which contain hazardous materials and fibers, such as asbestos. Another advantage of the present invention resides in the relative ease and less expensive handling of the removed tile which can be readily stacked in containers and shipped for safe disposal. Also, since the tiles are removed in one piece, i.e., the sections as installed which are typically one foot squares by approximately one eighth inch thick, substantially less asbestos fiber exposed ragged edges are exposed to the air and the workers doing the removal, stacking, shipping and disposal work.

OBJECTIVES OF THE INVENTION

It is an object of the present invention to provide an improved method for the removal floor of tile.

It is a further object of the present invention to provide a new method for the removal of asbestos floor tile.

It is a further object of the present invention to provide a new method for preventing the release of asbestos fibers into the air while removing asbestos floor tile from subflooring.

It is a further object of the present invention to provide a new method for the removal of asbestos floor tiles whereby each tile may be removed intact.

It is a further object of the present invention to provide a method for preventing asbestos fibers from becoming airborne during the removal of asbestos containing tile from floors.

It is a further object of the present invention to provide a method of replacing floor tiles.

It is a further object of the present invention to provide a method of removing asbestos floor tile whereby broken tile edges are eliminated.

It is a further object of the present invention to provide a method for the removal of floor tile whereby the removed tile may be stacked for relatively inexpensive transportation.

It is a further object of the present invention to provide a method for the removal of asbestos containing floor tile from a subfloor without breaking or cracking the tile into pieces.

It is a further object of the present invention to provide a new method for debonding a floor tile from a supporting structure.

It is a further object of the present invention to provide a method for rendering the bonding and/or adhesive medium between a tile and a supporting surface ineffective as a bonding medium whereby the tile may be readily removed.

It is a further object of the present invention to provide a new and improved method of altering the bonding and/or adhesive quality of the bonding agent between a floor tile and the subfloor supporting said tile whereby the floor tile may be more quickly and easily removed.

It is a further object of the present invention to provide a more economical method for the removal of floor tile.

It is a further object of the present invention to provide a substantially less laborious method and system for the removal of floor tile.

It is a further object of the present invention to provide a new and improved method and system for removing and handling hazardous waste material asbestos floor tiles.

It is a further object of the present invention to provide a new means whereby asbestos floor tile may be relatively more economically, easily and safely removed.

It is a further object of the present invention to provide a new and improved means whereby removed asbestos floor tile can be relatively more economically, easily and safely stacked, containerized and transported for disposal.

Further and other objects of the invention may be and may become apparent to one skilled in the art by a perusal of the disclosure in the present application, and it is to be understood that the present showings are by way of illustration only and are not to be considered as limitations.

SUMMARY OF THE INVENTION

Dry ice is placed in a frame mounted on wheels. The dry ice is covered with, for example, wet burlap, which dry ice rests on the (asbestos) floor tiles. Electric fans mounted on the frame blow air over the covered dry ice, down onto the asbestos floor tiles. The gases created by this procedure, (dry ice turns to gas at 78.5c/110F) cause the complete and clean separation of the (asbestos) floor tile from the subflooring.

When this process is monitored by approved Federal and State air monitoring equipment, a zero contaminant reading has been observed.

An asbestos floor tile removal system for uplifting asbestos floor tile from a subfloor, comprising:

means for reducing the temperature of the asbestos floor tile for a period of time to effect a substantial debonding between the asbestos tile and the underlying subfloor;

means for uplifting the debonded asbestos tile off the subfloor;

whereby the debonded and uplifted asbestos tile being removed substantially without degradation and virtually without emission of asbestos into the surrounding environment.

A relatively safe method for the removal and containerization of obsolete floor tile previously adhered to a subfloor by a bonding agent, which floor tile contains one or more hazardous materials such as asbestos, comprising the steps of:

applying a temperature reducing agent such as dry ice or a cryogen to one or more selected floor tile for a selected period of time for causing a reduction of the temperature of the selected floor tile and the underlying bonding agent to a level whereby the bonding agent being rendered substantially ineffective as a bonding medium;

uplifting the debonded floor tile in substantially uniform and unbroken floor tile sections;

stacking the uplifted uniform floor tile sections into container means;

sealing said container means for shipment;

whereby the debonded floor tile may be removed and containerized with virtually a zero hazardous material air contamination risk to the workers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
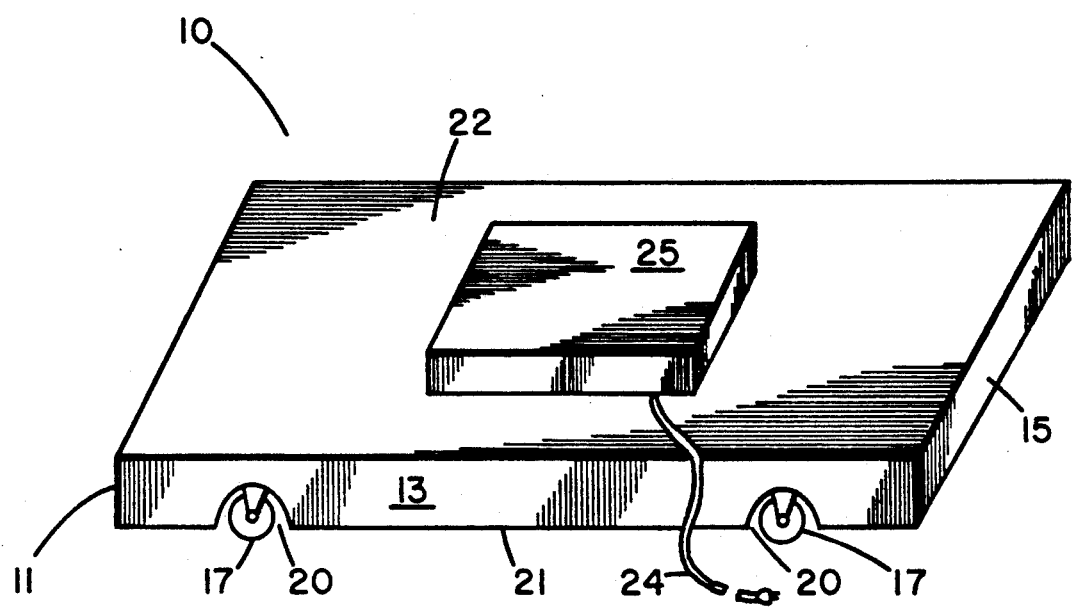
FIG. 1 is a perspective view of embodying apparatus designed in accordance with the present invention and being shown in operational disposition on a tile floor.

A preferred embodiment and an alternative embodiment of the invention will now be described with reference to the attached drawings, in which the same reference numerals are used to represent the same or corresponding elements throughout the various views.

Figure 2:
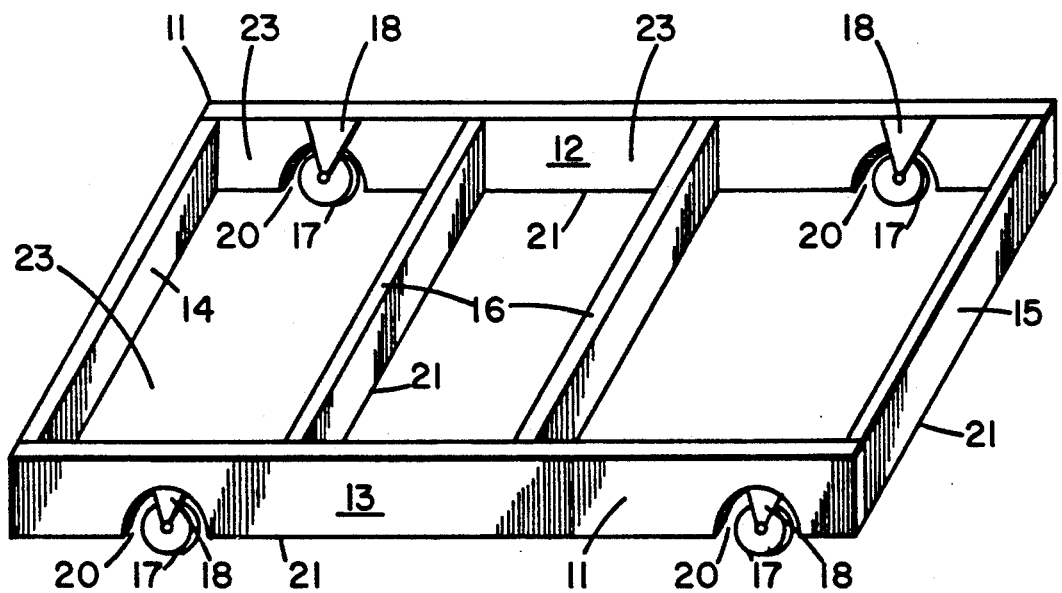
FIG. 2 is a perspective view of the apparatus shown in FIG. 1, with the top cover means and blower removed.
Figure 3:
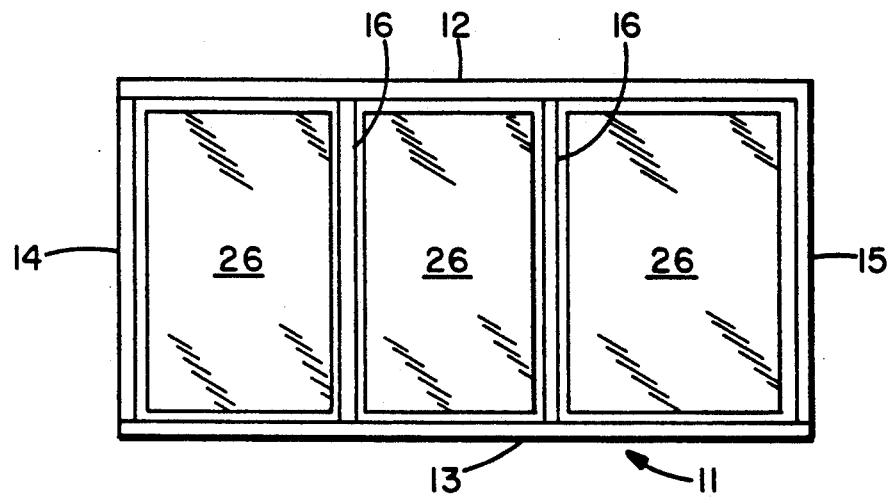
FIG. 3 is a top diagramatic view of the apparatus shown in FIG. 1, with the top cover means and blower removed.

With particular reference to FIGS. 1, 2, and 3, the apparatus 10 of the invention has a main housing 11, which is formed of a rigid material such as wood, plastic or metal. The housing 11 is basically formed of two side board members 12, 13 having a length of approximately 72 inches, a height of approximately 9 inches and a thickness of approximately ¾ inch, and two end board members 14, 15 each having a length of approximately 36 inches, height of approximately 9 inches and a thickness of approximately ¾ inch. Although the housing 11 has a rectangular configuration in accordance with the preferred embodiment of the invention, other shapes such as a square may be utilized in which the side and end board members are of substantially equal dimensions. Lateral support beams 16 may be structurally affixed to the housing 11 in conventional manner, for example, with screws, nuts and bolts (not shown) to provide increased structural strength and integrity to housing 11.

Four rollers or casters 17 of conventional design are operatively mounted to housing 11 in conventional manner, for example, by means of screws (not shown), nuts and bolts and mounting brackets 18, to facilitate the ability of a worker/operator to move and deploy the inventive device or apparatus 10 on and about a tile floor 19. Each caster 17 is set within a respective alcove 20 of housing 11 to enable the inventive device 10 to be placed in close juxtaposition with the walls (not shown) of the building. In this manner, application to or treatment of the tiles close to such walls may be accomplished. Each caster 17 is recessed within the respective alcoves 20 whereby the housing 11 is held slightly above the tile floor 19 a predetermined distance. For example, the bottom edges 21 of the side and end members 12-15, are maintained approximately ¼ to ¾ inches above the floor tile 19.

A top cover 22 having peripheral dimensions substantially equal to the dimensions of housing 11 is provided atop housing 11. Top cover 22 may be formed of burlap or other suitable material to cover the upper openings 23 formed within housing 11.

A blower device 25 is placed or mounted atop cover member 22 and is supportably positioned over support beams 16. Blower device 25 may be of conventional design having one or more electrically powered fans (not shown) for directing a stream of air downwardly over portions of a coolant such as dry ice and thence unto the floor tile.

OPERATION OF THE PREFERRED EMBODIMENT

The operation of the preferred embodiment of the invention will now be discussed with reference to FIGS. 1-4.

The housing 11 is placed on the tile floor selected for removal.

The interior spaces or alcove(s) 23 of housing 11 are substantially filled with dry ice 26.

Top cover 22, consisting of wet burlap, is placed over the dry ice 26 to substantially contain the gases being formed and the lower temperatures caused by the evaporating dry ice from freely escaping upwardly into the room environment.

The blower device 25, having one or more fans, is placed atop the burlap cover 22 and energized, via plug 24, to cause, a continuous flow of air through the wet burlap across the surface areas of the dry ice 26 and downwardly unto the tile floor beneath apparatus or debonder 10.

Debonder 10 is maintained in position over selected tile sections for a period of time sufficient to cause the bonding agent or cement glue 27 to substantially or completely lose its bonding or gluing properties between the treated tile and the underlying subfloor 28. The minimum time period may be determined empirically so as to enable an efficient and economical and quick debonding process.

Following the debonding process, debonder 10 is disposed over another selected portion of the tile floor 19 and the debonding process continues in a progressive section-by-section manner until all the tiles selected for removal have been debonded.

Following each sectional debonding, the debonded tiles, for example, tile 29 may be manually uplifted by a worker 30 (partially shown) with relative ease using standard tools 31, with the tiles 29, being generally intact. Since each tile is similarly removed intact, virtually no asbestos or other undesired and/or hazardous dust, and fibers are emitted into the rooms air environment. IN addition, since the tiles 29, are not broken into numerous ragged smaller pieces which are relatively more hazardous to handle, the workers are at less risk from lung, skin and clothing exposure and, consequently, contamination from asbestos. Thus, not only are the workers' risks reduced but also the risk is reduced for the family members who may come into contact with his clothing.

Next, the worker 30 (partially shown) can stack the substantially uniform (generally square) tiles into relatively neat piles 32 for removal from the work site or directly into cartons 33.

As each stack 32 of tiles is containerized, the neatly packaged tile may be more economically transported to a government approved disposal site. It should now be appreciated that not only are the risks of asbestos fiber contamination at the floor tile uplifting and containerizing site reduced or virtually eliminated, but that the risk to the transporters-carriers is also substantially reduced. For example, it should be apparent that much less risk of asbestos contamination is likely to occur if a carton of intact tiles should rupture or open while in transit than if the transporting container was filled with numerous various sized and shaped bits and pieces of ragged edged asbestos tile.

DESCRIPTION OF ALTERNATIVE EMBODIMENT

Figure 4:
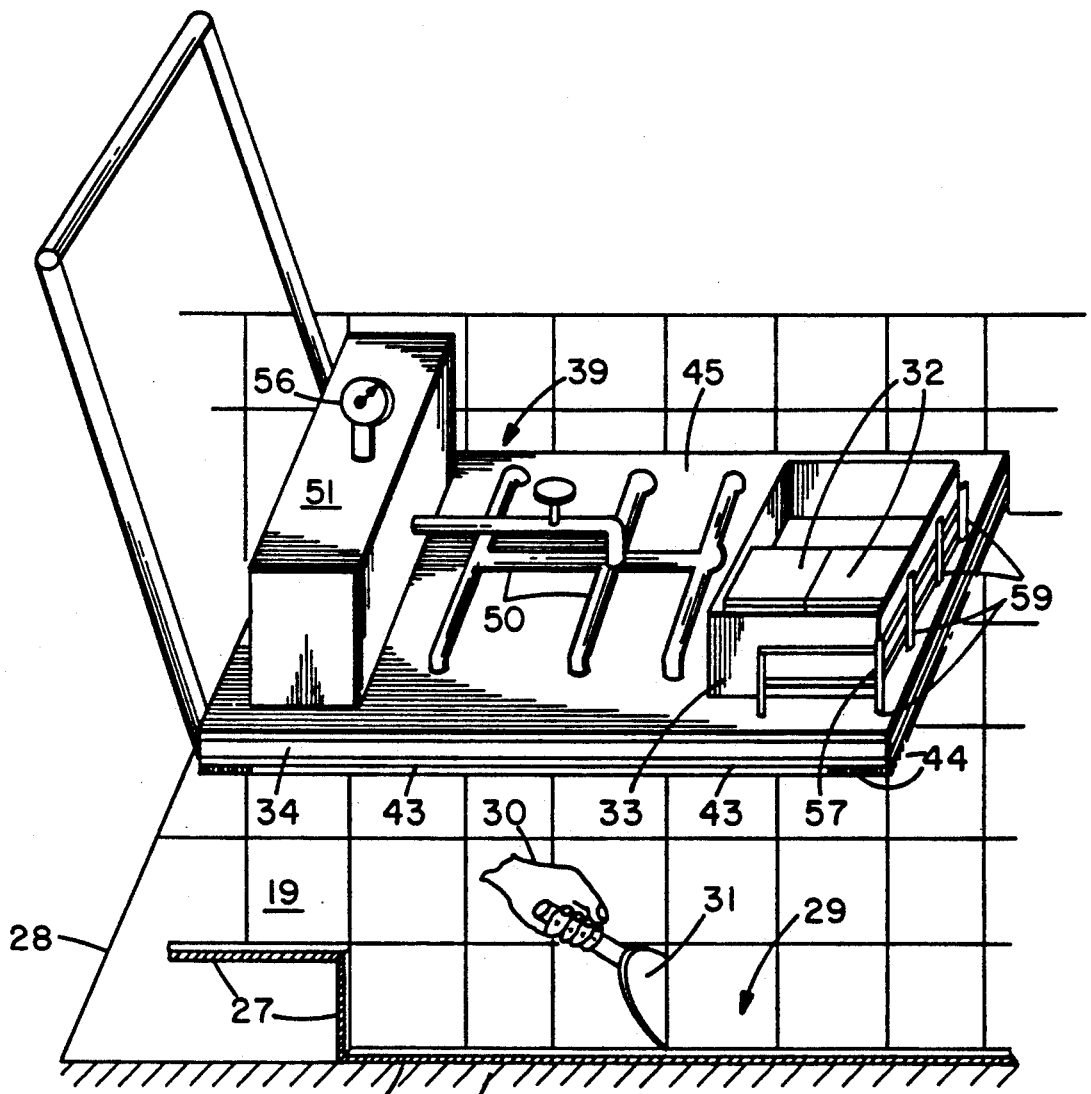
FIG. 4 is a perspective view of an alternative embodiment of apparatus designed in accordance with the present invention.
Figure 5:
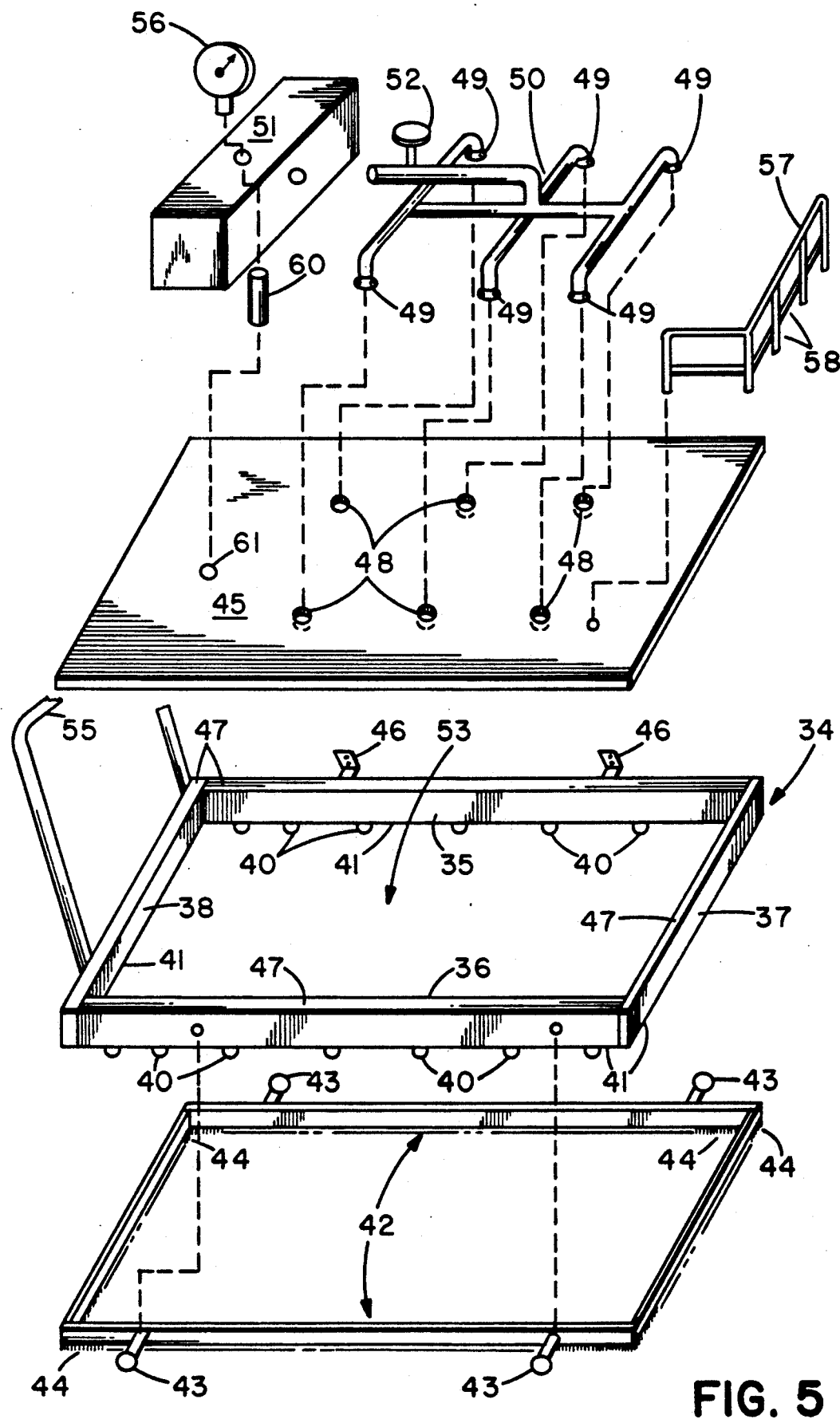
FIG. 5 is an exploded view of the alternative embodiment of apparatus illustrated in FIG. 4.

With reference now to FIGS. 4 and 5, an alternative embodiment 39 of the invention apparatus and system will now be discussed.

Housing frame 34 basically comprises a rectangular shaped frame having elongated side walls 35, 36, front end wall member 37, and rear end wall member 38. A pair of front and rear rollers or casters or roller bearing means 40 are mounted in conventional manner to housing 34. Roller-bearings 40 are mounted to facilitate the disposition of debonder 39 upon the tile floor 19, and to space the bottom edges 41 of housing 34 slightly higher, for example, between ⅛ inch to 1 inch, above the tile floor 19.

A skirt member 42 is affixed by conventional means, such as screws 43, about the lower periphery of housing 34. Skirt member 42 may be formed of rubber, plastic or other suitable material and a plurality of protruding fibers 44 similar to a brush or other suitable substances to form a flexible skirt means which extends downwardly into rubbing contact with the tile floor 19. The general purpose of the skirt member 42 is to form a flexible element with the contours of the tile floor 19, while constraining the refrigerant reduced temperature in contact with the tiles located below debonder 39.

A cover plate 45 is provided to be mounted to frame 34, for example, by hinge means 46. Cover plate 45 is dimensioned to rest upon the peripheral ledge or edge 47 of frame 34. Cover plate 45 is affixed to frame 34 in conventional manner, for example, by screws and hinges 46. Cover plate 45 may be formed of metal, wood, plastic or other suitable material. A plurality of holes 48 are provided in cover plate 45 to accommodate nozzle means 49 discussed in more detail hereinafter.

Pipe network 50 is mounted atop cover plate 45. Pipe network 50 comprises a refrigerant or cryogen distribution means. Pipe network 50 may be formed of metal or plastic pipes having suitable properties as a conduit for the cryogen-refrigerant to nozzle means 49. Pipe network 50 is operatively connected to a source 51 of pressurized refrigerant or liquid cryogen such as, for example, liquid nitrogen or carbon dioxide. A control valve 52 is connected to pipe network 50 for controlling the flow rate of the refrigerant/cryogen to nozzle means 49.

Nozzle means 49 comprises a plurality of conventional nozzles operatively connected to pipe network 50 for applying or distributing the refrigerant/cryogen substances downwardly into chamber 53 which is defined by frame 34 and cover plate 45. Gasket means (not shown) may be provided as a seal between cover plate 45 and nozzle means 49.

A handle means 55 may be provided to facilitate placement and handling of debonder 39. A temperature gauge means 56 of conventional design may be operatively mounted to debonded 39 having a temperature measuring means 60 projection via hole 61 into the refrigeration chamber 53.

A mounting rack 57 comprises a plurality of bars 58 affixed, for example, welded 59, to cover plate 45 to form a container 33 receiving storage rack means.

OPERATION OF THE ALTERNATIVE EMBODIMENT

The operation of the alternative embodiment of the invention will now be discussed.

The debonder 39 is placed on the tile floor 19 with skirt means 42 contributing to form a substantial cooling chamber 53.

Control valve 52 is opened to permit the flow of the refrigerant/cryogen liquid/gas to flow through pipe network 50 and delivered, via nozzle means 49, into the cooling chamber 53. In this manner, the lowered temperature within chamber 53 is applied to the floor tiles positioned below chamber 53 and, thereby, to the bonding agent 27. Thus, in similar manner to the preferred embodiment, the bonding agent 27 is subjected to such lowered temperature for a period of time to cause the debonding effect. This time period may be empirically determined.

The other process steps and system is similar to that describe above with reference to the preferred embodiment.

Obviously, numerous modifications and variations of the present invention are possible in light of the above teachings. It is therefore to be understood that within the scope of the appended claims, the invention may be practiced otherwise that as specifically described herein.

In the appended claims the terms "debond" or "debonding" are used to define a process whereby air, gas, cryogen refrigerant agent or dry ice (having a relative low temperature) is applied to a floor tile to cause the substantial or total ineffectiveness of the bonding agent to bond or hold in place such tiles with the subfloor.

The term "Debonder" is used to describe apparatus designed in accordance with the present invention to apply or implement one or more steps in the debonding containerizing process of floor tiles.

What is claimed is:

1. A relatively safe method for the removal and containerization of obsolete floor tile previously adhered to a subfloor by a bonding agent, which floor tile contains one or more hazardous materials, comprising the steps of:

applying a temperature reducing agent selected from the group consisting of dry ice and a cryogen to one or more selected floor tiles for a selected period of time for causing a reduction of the temperature of the selected floor tile and the underlying bonding agent to a level whereby the bonding agent is rendered substantially ineffective as a bonding medium;

uplifting the debonded floor tile in substantially uniform and unbroken floor tile sections;

stacking the uplifted uniform floor tile sections into container means;

sealing said container means for shipment;

whereby the debonded floor tile may be removed and containerized with virtually a zero hazardous material air contamination risk to the workers.

* * * * *